US009798340B2

(12) United States Patent
Bhattad et al.

(10) Patent No.: US 9,798,340 B2
(45) Date of Patent: Oct. 24, 2017

(54) CIRCUIT WITH CONTROLLED INRUSH CURRENT

(71) Applicant: Dialog Semiconductor GmbH, Kirchheim/Teck-Nabern (DE)

(72) Inventors: Ambreesh Bhattad, Swindon (GB); Frank Kronmueller, Neudenau (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 163 days.

(21) Appl. No.: 14/521,765

(22) Filed: Oct. 23, 2014

(65) Prior Publication Data
US 2015/0145493 A1 May 28, 2015

(30) Foreign Application Priority Data
Nov. 26, 2013 (EP) ..................... 13194406

(51) Int. Cl.
G05F 1/56 (2006.01)
G05F 1/569 (2006.01)
H02H 9/00 (2006.01)
G05F 1/573 (2006.01)
H02M 1/36 (2007.01)

(52) U.S. Cl.
CPC ................ *G05F 1/56* (2013.01); *G05F 1/562* (2013.01); *G05F 1/569* (2013.01); *H02H 9/001* (2013.01); *G05F 1/573* (2013.01); *G05F 1/5735* (2013.01); *H02M 1/36* (2013.01)

(58) Field of Classification Search
CPC . G05F 1/56; G05F 1/562; G05F 1/573; G05F 1/569; G05F 1/5735
See application file for complete search history.

(56) References Cited

U.S. PATENT DOCUMENTS

| 5,883,504 A | 3/1999 | Okada | |
| 2003/0137286 A1* | 7/2003 | Kimball | .............. H02M 3/1584 323/271 |
| 2012/0068673 A1 | 3/2012 | Stellberger et al. | |
| 2012/0262137 A1* | 10/2012 | Arigliano | ................ G05F 1/573 323/277 |

OTHER PUBLICATIONS

European Search Report 13194406.8-1809 dated Apr. 22, 2014, Dialog Semiconductor GmbH.

* cited by examiner

Primary Examiner — Timothy J Dole
Assistant Examiner — Ishrat Jamali
(74) Attorney, Agent, or Firm — Saile Ackerman LLC; Stephen B. Ackerman

(57) ABSTRACT

A circuit is provided with inrush current protection through control of the output current at start-up by a current source that does not rely on the output capacitor and which provides a smooth transition from a controlled current mode during a start-up phase to a voltage regulation mode.

18 Claims, 5 Drawing Sheets

CIRCUIT WITH CONTROLLED INRUSH CURRENT

TECHNICAL FIELD

The present disclosure relates to a circuit with a controlled inrush current.

BACKGROUND

Various types of circuits are provided with decoupling capacitors which provide local energy storage and decouple one part of a circuit from another to reduce noise. Examples of such circuits include (but are not limited to) power management components such as amplifiers, drivers, charge pumps, low dropout regulators (LDOs), buck converters and boost converters. It is important to limit the inrush current for these types of circuits that occurs when a power supply is first switched on. At that point, capacitors or other storage elements forming part of the circuit are not charged up and so the high peak currents that result can damage the circuitry, or cause operation of the circuit to be unreliable or to fail altogether.

Circuits of this type can for example be found as component parts of a power management integrated circuit (PMIC) which is provided to manage the power requirements of a host system and which may comprise various sub-blocks such as low drop-out voltage regulators (LDO), DC-DC buck convertors, DC-DC boost converters and so on.

An example use-case for a PMIC is shown in FIG. 1. Here, a mains charger circuit 100 powers a PMIC 102 and a battery 104. A switch 106 can be used to charge the battery 104 when the charger 100 is attached or be used in absence of charger 100 to power the PMIC 102 from the battery 104.

Consider a scenario where the charger circuit 100 is charging both the battery 104 and powering the PMIC 102. The maximum current from the charger is I1. Under no condition should I2+I3 become more than I1. If that happens, the charger circuit 100 will be overloaded and the output voltage from the charger will fall causing the PMIC to reboot.

The PMIC comprises various sub-components which in this illustration comprise one or more LDOs 108 and one or more buck convertors 110. The PMIC sub-components comprise output decoupling capacitors which need to be charged when the sub-component is enabled. The maximum current at their start-up would be limited only by the maximum current of the sub-component (buck or LDO) circuit. If this current is more than I1–I3, which it could be, the system may shutdown and go into a loop of starting and shutting down.

To avoid a situation like this the start-up current for the sub-blocks of PMIC need to be regulated. It is desirable for this regulation to be independent of one or more of supply, process and temperature.

Charger circuit 100 and battery 104 each have an output impedance, bandwidth and maximum current capability. As these components are external to PMIC these parameters may vary considerably. When any of the sub-blocks in PMIC are enabled during the battery charging process, the current at start-up would come from supply decoupling capacitors at the input of PMIC. This would require a large value decoupling capacitor which would occupy significant area on a printed circuit board (PCB). This would be very expensive, in particular for a handheld electronic device where there is great pressure to minimise PCB area occupied by each circuit.

If the sub-block start-up current could be well regulated, and the time taken to reach the maximum regulated current at start-up be controlled, this would additionally allow a reduction in the size of the supply decoupling capacitor too.

Further, a very sharp edge in the start-up current can generate undesired effects in other components that are supplied by the PMIC. For example, in audio applications this effect may generate harmonics in the audio frequency and may cause interference with the audio. This effect is independent of the charging status.

SUMMARY

It would therefore be desirable to provide a voltage regulator with a controlled inrush current that is independent of one or more of process, temperature, supply voltage and output capacitor.

According to a first aspect of the disclosure there is provided a circuit for managing power provided at an output and comprising:
  a decoupling capacitor at the output;
  a pass device for selectively delivering output current and charging the decoupling capacitor;
  a driving circuit for the pass device comprising
    an override transistor,
    a differential amplifier for regulating an output voltage and
    an output transistor coupled with an output of the differential amplifier;
  a current source that is coupled with said override transistor when the circuit is in a start-up state and which controls the start-up current at the pass device;
  and wherein the override transistor and the differential amplifier output transistor are coupled such that a voltage across the differential amplifier output transistor changes with the voltage across the override transistor, and the override transistor transitions between saturation at start-up to a linear mode.

The circuit is in a "start-up state" before and at the time of application of an input voltage for the first time or in a new power cycle. At that point, the decoupling capacitor is not charged and the output voltage is at ground potential. The override transistor is coupled with the current source in this start-up state but also can remain coupled with the current source in other circuit states or even indefinitely.

The "coupling" of one component with another does not mean that the two components have to be directly connected; in other words the coupling may be indirect or direct.

Optionally, the current source comprises a current DAC.

Optionally, the output of the current DAC is coupled with the pass transistor via one or more current mirrors.

Optionally, the circuit comprises a current limit loop that is decoupled from the override transistor when the circuit is in the start-up state.

Optionally, the circuit comprises:
  a first detector circuit for monitoring the output charging current;
  a second detector circuit for monitoring the output voltage; and
  switch means arranged to decouple the override transistor from the current source and couple the override transistor to the current limit loop when said monitored output charging current has decreased to a predetermined level and said output voltage rises to a value close to a desired regulated voltage.

Optionally, the first detector circuit asserts a current command signal when said output charging current has decreased to a predetermined level, the second detector circuit asserts a voltage command signal when said output voltage rises to a value close to a desired regulated voltage; and the circuit comprises a decision logic component that receives the current command signal and voltage command signal and acts thereon to control the switch means.

Optionally, the circuit comprises a low dropout regulator.

Alternatively, the voltage regulator circuit comprises a buck convertor.

According to a second aspect of the disclosure there is provided a power management system comprising a power supply and a power management integrated circuit comprising various sub-component circuits wherein one or more of the sub-component circuits comprises a circuit for managing power provided at an output of the sub-component and comprising:
- a decoupling capacitor at the output;
- a pass device for selectively delivering output current and charging the decoupling capacitor;
- a driving circuit for the pass device comprising
  an override transistor,
  a differential amplifier for regulating an output voltage and
  an output transistor coupled with an output of the differential amplifier;
- a current source that is coupled with said override transistor when the circuit is in a start-up state and which controls the start-up current at the pass device;

and wherein the override transistor and the differential amplifier output transistor are coupled such that a voltage across the differential amplifier output transistor changes with the voltage across the override transistor, and the override transistor transitions between saturation at start-up to a linear mode.

Optionally, the power supply comprises a battery and/or a mains supply circuit.

Optionally, the sub-components comprise one or more low dropout regulators and/or one or more buck converters.

According to a third aspect of the disclosure there is provided a power management method. A method for power management comprise the following steps: a first step (A) providing an override transistor, a second step (B) providing a differential amplifier, a third step (C) coupling an override transistor and the differential amplifier output transistor, a fourth step (D) coupling an output transistor with an output of said differential amplifier; a fifth step (E) coupling a current source that is coupled with said override transistor, a sixth step (F) selectively delivering an output current, and seventh step (G) charging the decoupling capacitor.

BRIEF DESCRIPTION OF THE DRAWINGS

The disclosure will now be described, by way of example only, with reference to the accompanying drawings, in which.

DESCRIPTION

Figure 1:
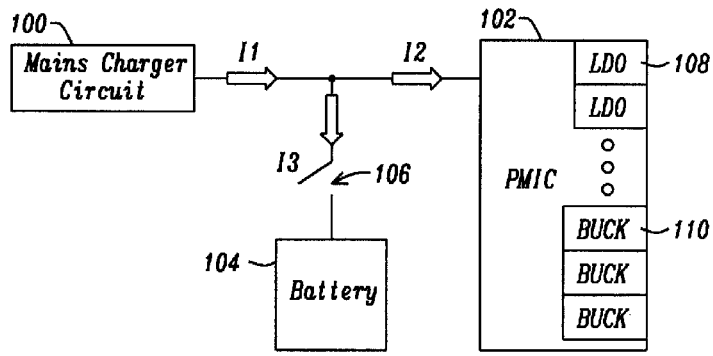
FIG. 1 illustrates a power management integrated circuit (PMIC) coupled with a mains charger circuit and a battery.
Figure 2:
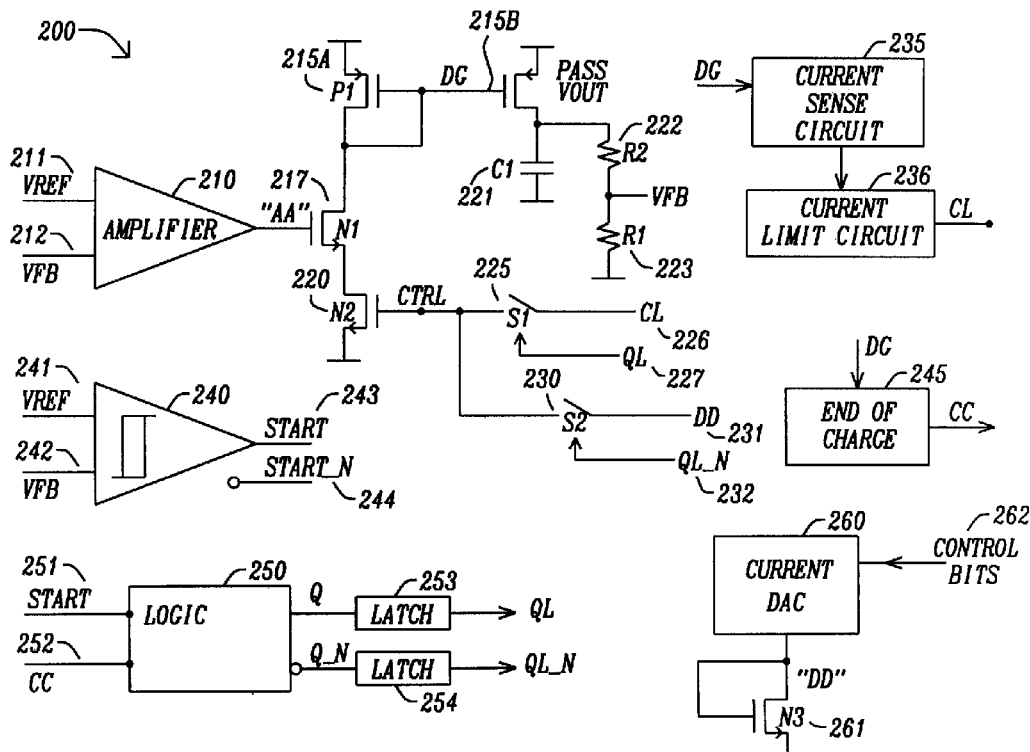
FIG. 2 is a schematic diagram illustrating an LDO with a controlled inrush current according to a first embodiment of the disclosure.

FIG. 2 is a schematic diagram illustrating a first embodiment of the disclosure, in which an LDO is provided with a controlled inrush current. In the circuit 200, R1 223 and R2 222 form the resistor divider network for fixing the output voltage, and C1 221 is a decoupling capacitor at the output of the LDO. N2 220, N1 217, P1 215A and the amplifier form a driving circuit for the pass transistor Ppass 215B. A current sense circuit and a current limit circuit along with N2 220 and S1 225 form a current limit loop in normal operation.

The current at start-up is decided by the current DAC along with N3 261 and N2 220 (S2 is closed at this point). The "END OF CHARGE" circuit along with the comparator circuit and the logic circuit determine the transition from controlled current mode at start-up to regulated output voltage mode.

At start-up, C1 221 is not charged and VOUT is at ground potential. "START" is pulled low as VFB is also at ground potential. The node "AA" is pulled to supply. The "LOGIC" sets "Q" and "QL" as low. Switch S1 225 is open and S2 230 is closed. Node "DD" 231 is shorted to "CTRL". In this way, a controlled current mode is implemented.

N3 261 and N2 220 form a current mirror and the current in N3 261 is defined by that of that output from the DAC:

$$I(N3)=IDAC.$$

The aspect ratio of a MOS transistor is defined from its dimensions as W/L=AX. So the current in N2 220 is:

$$I(N2)=IDAC*(AN2/AN3).$$

Transistors P1 215A and PPASS 215B form another current mirror. The current in P1 215A is set by the current in N2 220. The current at start-up through pass transistor PPASS 215B is defined by following equation:

$$IPPASS=I(N2)*(APPASS/AP1).$$

Therefore, the start-up current can be modified by changing any one or more of IDAC, the ratio AN2/AN3 or the ratio APPASS/AP1. The transistor aspect ratios may be set at the time of manufacture to desired values.

As the output voltage starts to rise and come closer to its required regulated voltage node "AA" moves down from supply potential to its normal operating voltage which is close to threshold voltage of N1.

The reduction in gate potential of N1 (AA) 217 reduces the potential across N2 220 and transistor N2 220 transitions from saturation to a linear region of operation. This gradual transition achieves the smooth transition from a controlled current to a controlled voltage mode of operation.

Reduction in voltage across N2 220 reduces the charging current. The reduction of charging current is sensed by "END OF CHARGE" circuit 245 and its output "CC" is asserted. The output of comparator "START" 251 is also asserted when "VOUT" is close to its required regulated voltage. Once both "CC" 252 and "START" 251 are asserted "QL" 227 is asserted. S2 230 is opened and S1 225 is closed. The current limit loop is restored. Assertion of "QL" 227 determines a voltage regulation mode of operation and the end of a start-up phase for the LDO.

N2 220 acts as an override transistor, which can be selectively coupled between either a current source or a current limit loop. N2 220 is connected to the current source (DAC 260 and N3 261) at start-up and throughout the course of the start-up phase. However once the start-up phase ends, N2 220 is disconnected from the current source and instead connected to the current limit loop.

Figure 3:
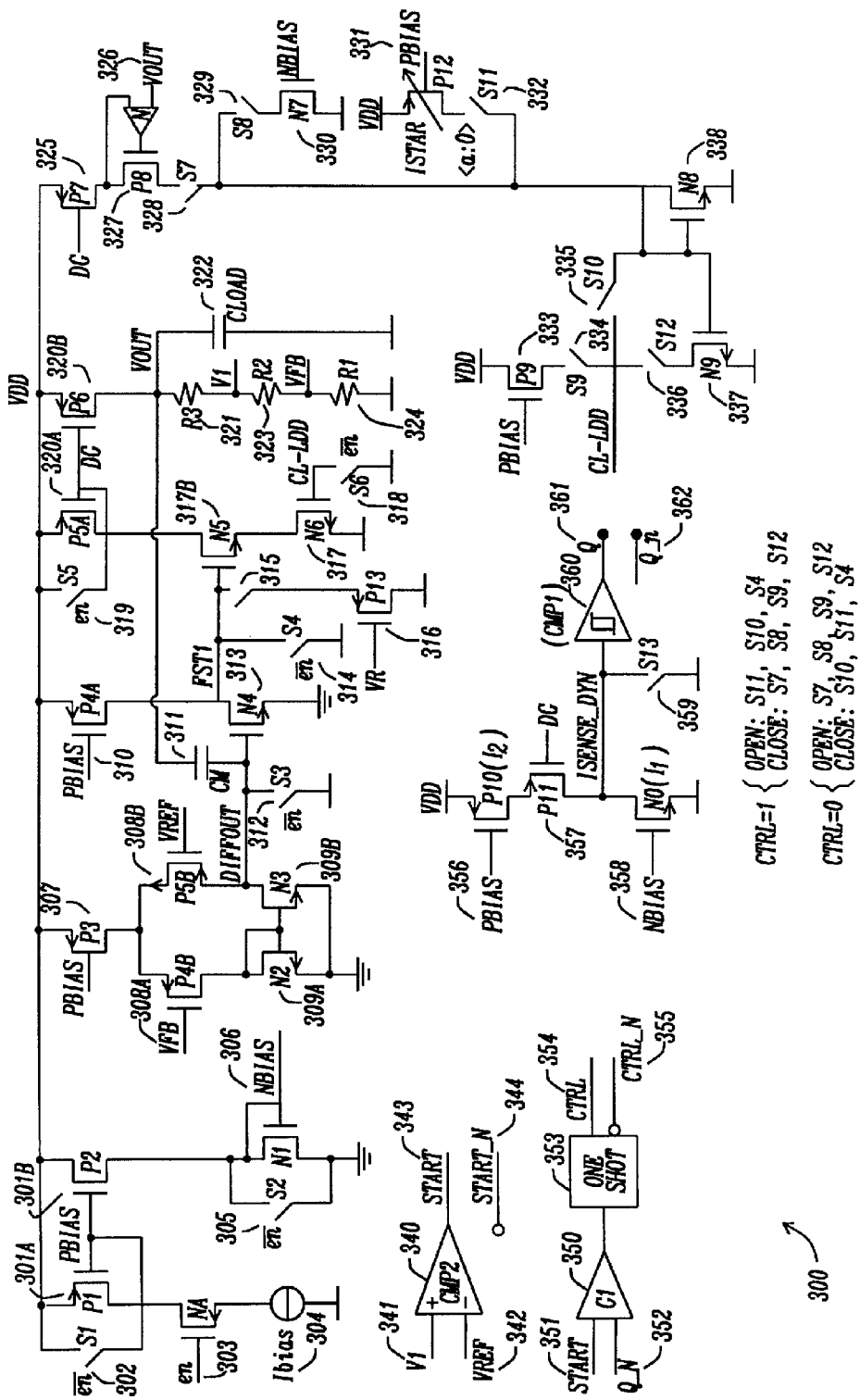
FIG. 3 is a more detailed schematic, illustrating one possible way of implementing the embodiment illustrated in FIG. 2.

FIG. 3 shows an example detailed implementation for realising a circuit 300 according to the schematic of FIG. 2, for controlling the start-up current of an LDO.

Ibias 304, NA 303, P1 301A, P2 301B and N1 306 form the biasing circuit for the LDO. Switches S1 to S6 {302, 305, 312, 314, 315, 318} and S13 359 are used to define the potential for internal nodes of the LDO when the LDO is OFF or en is set low. Nodes PBIAS and DG are pulled to VDD. Nodes NBIAS, DIFFOUT, FST1, CL_LDO, ISENSE_DYN are pulled to ground.

P2 301B, P3 307, P4A 310, P9 333, P10 356 and P12 331 are current sources. N0 358, N7 330 are current sinks, and P3 307, P4A 310, P5A 320A, N2 309A & N3309B form a differential amplifier that regulates the output voltage VOUT.

N4 313, P4A 310, N5 317B, N6 317, P5A 320A forms the driver circuitry for pass device P6 320B, and P7 325, P8 327, [NOTE: In the original draft but not in the drawings], N7 330, N8 338, P9 337, N6 317, N5 317B, P5A 320A form the current limit loop for the LDO.

P12 331 is a current DAC and P12 331, S11 332, N8 338, S10 335, N6 317, N5 317B, P5A 320A, P6 320B form a network of current mirrors. The current DAC and these current mirrors together define the current at start-up of LDO. The current through the current DAC is controlled by control bits ISTART<a:0>.

P13 316, S4 314 is the circuit used to clamp the FST1 node such that the voltage across N6 is constant independent of VDD.

CMP2 340 is a comparator that decides if the output voltage has reached a predetermined level, which may be set at a desired portion of the regulated voltage, for example from 95% to 99%. At start-up as VOUT=0, START=0.

P10 356 (current source), P11 357, N0 (current sink) 358 and CMP1 360 form a circuit that senses the end of controlled current phase for charging the output capacitor CLOAD 322. The current source P10 356 and current sink NO 358 are sized such that when P10 356 is in saturation current from P10 356 is larger than NO 358 and the node ISENSE_DYN is pulled high. P11 357 and P6 320B are ratioed such that P10 356 will be in saturation only if the current in P6 356 is more than Imin (it can be adjusted for other values if required). ISENSE_DYN is pulled low till current in P6 320B is below Imin.

The output of CMP2 340 and negative output of CMP1 360 are ANDed using logic gate G1 and the output is used to trigger a one-shot. The output one-shot, "CTRL" is used to control the switches S4/7/8/9/10/11/12. When "CTRL" is low S7/8/9/12 are open and S10/11/4 are closed and vice-versa.

When en is asserted, VOUT=0V so output of CMP2 340, "START" is low. Until the current in P6 320B is below Imin, Q_n is high. The input to the one-shot is low and "CTRL" is set low. With CTRL low, switches S11 332 and S10 335 are closed and P11 357 along with N8 338 and N6 317 form a current mirror. The current from N6 317 flows through N5317B into P5A 320A and is mirrored into P6 320B. P5A 320A and P6 320B also form a current mirror. The current at the output for charging the load capacitor CLOAD 322 is given by the following equation:

Current from $P12 = Idac$

Ratio1 = (Size of $N6$)/(Size of $N8$)

Ratio2 = (Size of $N6$)/(Size of $N5$)

$Istart\text{-}up = Idac * Ratio1 * Ratio2$

During start-up, after assertion of "en" VFB is very small compared to VREF, which forces DIFFOUT to be close to ground. N4 313 is OFF and node FST1 rises towards VDD. As the voltage at FST1 increases a threshold voltage above VR, the current from P4A 310 flows via S4 314 and P13 316 to ground. The circuit clamps the voltage at FST1. This circuits helps maintain a constant VDS across N6 317 during the controlled current charging phase.

As the output capacitor CLOAD 322 gets charged and VOUT reaches the desired regulated voltage, the difference between VREF and VFB reduces which results in DIFFOUT rising above the ground and coming close to its desired operating voltage in normal mode of operation. As the potential at DIFFOUT rises N4 313 starts to turn ON and the current from P4A 310 diverts from P13 316 to N4 313, resulting in the potential at FST1 reducing and coming close to normal operating condition. As FST1 reduces, the voltage across N6 317 reduces which crushes N6 317 and the current in the branch N6 317, N5 317B, P5A 320A reduces which reduces the charging current flowing out of P6 320B to charge CLOAD.

Once V1 341 goes above VREF 342 the output of CMP2 340, "START" gets asserted. Once VFB is very close to VREF the current through P6 320B becomes lower than Imin and ISENSE_DYN is pulled to ground, asserting Q_n. The input to the one-shot is asserted which asserts "CTRL" marking the end of the controlled current charging phase and also indicating that the output voltage is a few mV lower than the desired target voltage.

Figure 4:
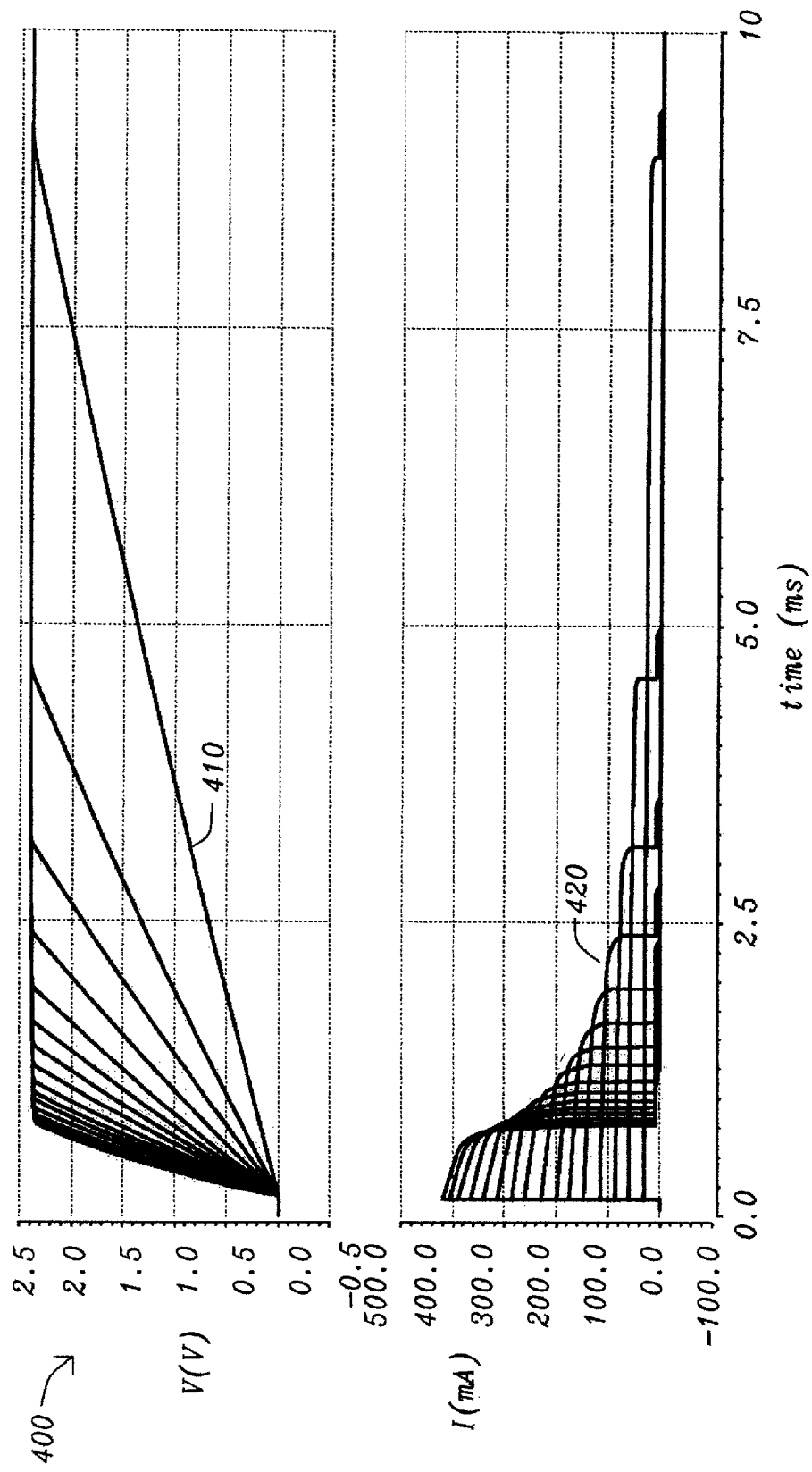
FIG. 4 shows plots illustrating the charging of an output capacitor of an LDO according to the embodiment of FIG. 3, for different start-up currents.

FIG. 4 shows charging of output capacitor of an LDO 400 according to the embodiment of FIG. 3 with different start-up current. The top plot 410 shows voltage with respect to time and the bottom plot 420 shows current with respect to time.

There is no overshoot observed at the output of the LDO. Once the output voltage of LDO is few mV below the target voltage, the slope for the charging of the output voltage changes showing a transition from controlled current charging phase to a controlled voltage phase.

Figure 5:
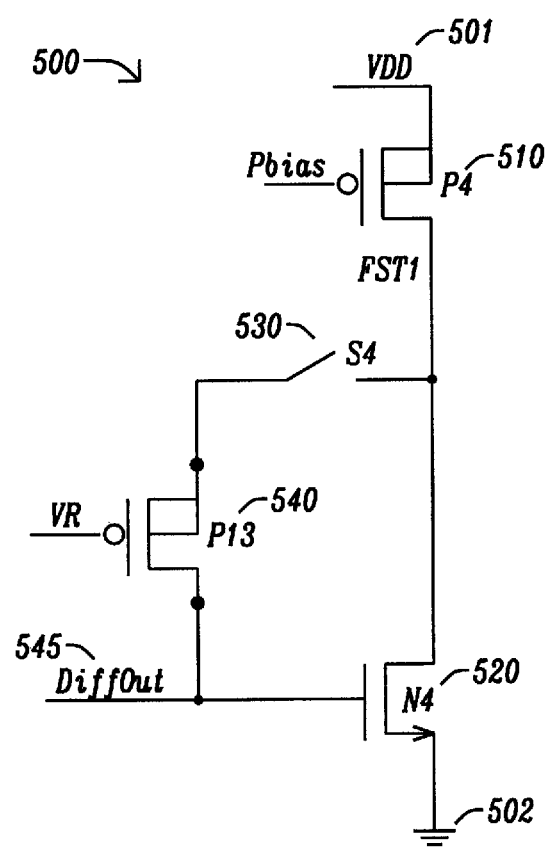
FIG. 5 shows an alternative implementation option for selected circuit components of the embodiment of FIG. 3.

FIG. 5 500 shows an alternative way of clamping the node FST1 of FIG. 3. FIG. 5 is powered by VDD 501, and ground 501. P4 510, S4 530, P13 540, N4 520 are as shown in FIG. 3. This alternative arrangement can balance the current in the active load (N2 309A and N3 309B of FIG. 3) of the differential amplifier even when VREF is much larger than VFB (during the start-up phase).

Figure 6:
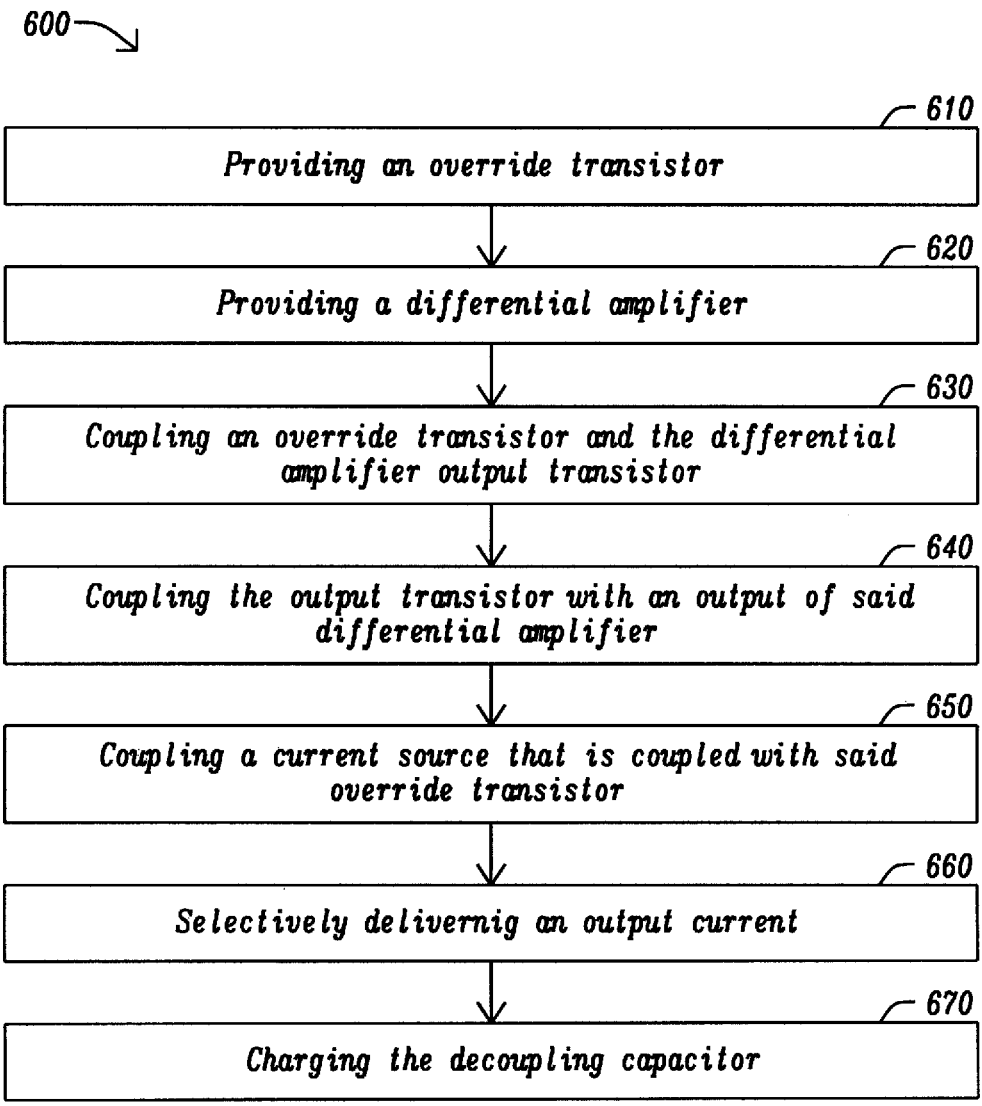
FIG. 6 illustrates a method for power management in accordance with an embodiment in the disclosure.

FIG. 6 illustrates a method for power management. A method 600 for power management comprise the following steps: a first step 610 providing an override transistor, a second step 620 providing a differential amplifier, a third step 630 coupling an override transistor and the differential amplifier output transistor, a fourth step 640 coupling an output transistor with an output of said differential amplifier; a fifth step 650 coupling a current source that is coupled with said override transistor, a sixth step 660 selectively delivering an output current, and seventh step 670 charging the decoupling capacitor.

Various improvements and modifications may be made to the above without departing from the scope of the disclosure.

What is claimed is:

1. A circuit for managing power provided at an output and comprising:
   a decoupling capacitor at the output;
   a pass device for selectively delivering output current and charging the decoupling capacitor;
   a driving circuit for the pass device comprising an override transistor,
   a differential amplifier for regulating an output voltage and
   an output transistor coupled with an output of the differential amplifier;
   a current source that is coupled with said override transistor when the circuit is in a start-up state and which controls the start-up current at the pass device;
   wherein the override transistor and the differential amplifier output transistor are coupled such that a voltage across the differential amplifier output transistor changes with the voltage across the override transistor, and the override transistor transitions between saturation at start-up to a linear mode,
   and wherein a current limit loop is decoupled from the override transistor when the circuit is in the start-up state.

2. The circuit of claim 1, wherein the current source comprises a current DAC.

3. The circuit of claim 2, wherein the output of the current DAC is coupled with the pass transistor via one or more current mirrors.

4. The circuit of claim 1, comprising:
   a first detector circuit for monitoring the output charging current;
   a second detector circuit for monitoring the output voltage; and
   switch means arranged to decouple the override transistor from the current source and couple the override transistor to the current limit loop when said monitored output charging current has decreased to a predetermined level and said output voltage rises to a value close to a desired regulated voltage.

5. The circuit of claim 4, wherein the first detector circuit asserts a current command signal when said output charging current has decreased to a predetermined level, the second detector circuit asserts a voltage command signal when said output voltage rises to a value close to a desired regulated voltage; and the circuit comprises a decision logic component that receives the current command signal and voltage command signal and acts thereon to control the switch means.

6. The circuit of claim 1, comprising a low dropout regulator.

7. The circuit of claim 1, comprising a buck convertor.

8. A power management system comprising a power supply and a power management integrated circuit comprising various sub-component circuits wherein one or more of the sub-component circuits comprises a circuit for managing power provided at an output of the sub-component and comprising:
   a decoupling capacitor at the output;
   a pass device for selectively delivering output current and charging the decoupling capacitor;
   a driving circuit for the pass device comprising an override transistor,
   a differential amplifier for regulating an output voltage and
   an output transistor coupled with an output of the differential amplifier;
   a current source that is coupled with said override transistor when the circuit is in a start-up state and which controls the start-up current at the pass device;
   wherein the override transistor and the differential amplifier output transistor are coupled such that a voltage across the differential amplifier output transistor changes with the voltage across the override transistor, and the override transistor transitions between saturation at start-up to a linear mode,
   and wherein a current limit loop is decoupled from the override transistor when the circuit is in the start-up state.

9. The system of claim 8, wherein the power supply comprises a battery and/or a mains supply circuit.

10. The system of claim 9, wherein said sub-components comprise at least one low dropout regulator and/or at least one or more buck converters.

11. The system of claim 8, wherein said sub-components comprise one or more low dropout regulators and/or one or more buck converters.

12. The system of claim 8 wherein said sub-components are a plurality of low dropout regulators.

13. The system of claim 8, wherein sub-components are a plurality of buck converters.

14. A method for power management comprising of the steps:
   providing an override transistor;
   providing a differential amplifier;
   coupling the override transistor and the output transistor of said differential amplifier;
   coupling the output transistor with an output of said differential amplifier;
   coupling a current source with said override transistor;
   selectively delivering an output current;
   charging the decoupling capacitor; and
   providing a current limit loop that is decoupled from the override transistor in a start-up phase.

15. The method of claim 14, wherein a voltage across said output transistor of said differential amplifier changes with said override transistor voltage.

16. The method of claim 14, wherein said override transistor overrides transitions between saturation at start-up to a linear mode.

17. The method of claim 14, wherein said current source controls the start-up current at the pass device which provides a smooth transition from a controlled current mode during the start-up phase to a voltage regulation mode.

18. The method of claim 14, wherein said current source does not rely on the output capacitor to provide a smooth transition from a controlled current mode during a start-up phase to a voltage regulation mode.

* * * * *